May 18, 1943. O. E. NESHAIM 2,319,511
COFFEE BREWING UTENSIL
Filed Sept. 4, 1940
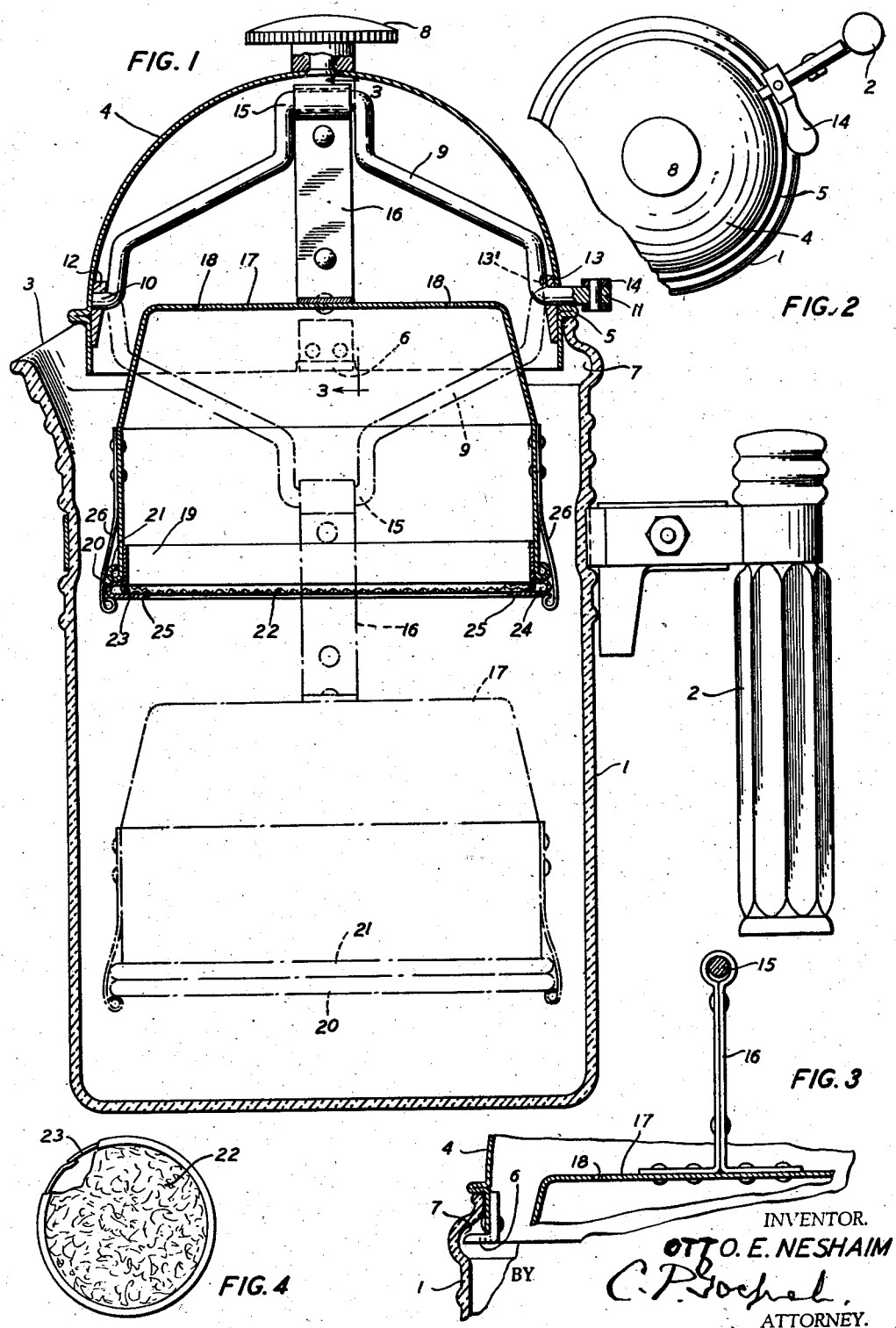
INVENTOR.
OTTO E. NESHAIM
BY C. P. Gochel,
ATTORNEY.

Patented May 18, 1943

2,319,511

UNITED STATES PATENT OFFICE 2,319,511

COFFEE BREWING UTENSIL

Otto E. Neshaim, New York, N. Y.

Application September 4, 1940, Serial No. 355,287

1 Claim. (Cl. 53—3)

This invention relates to new and useful improvements in coffee brewing utensils or the like, and more particularly to that type of brewing utensil having an auxiliary receptacle containing the coffee or other materials to be brewed, and has for its object to provide a novel mechanism for suspending the auxiliary receptacle within the brewing utensil whereby said receptacle may be elevated above the level of the water or immersed in the water in the brewing utensil.

Another object of the invention is to provide a novel mechanism of this character whereby the auxiliary container may be elevated or immersed without the necessity of removing the cover of the utensil.

The invention consists in a coffee pot or the like having suspended therein a container for the coffee to be brewed, the container being connected to a rotatable crank mechanism disposed within the cover of the coffee pot and operated by a small actuating lever adjacent the top of the coffee pot.

With the above and other objects in view which will appear as the description proceeds the invention resides in the novel features hereinafter set forth, illustrated in the accompanying drawing and more particularly pointed out in the appended claim.

Referring to the drawing in which numerals of like character designate similar parts throughout several views—

Fig. 1 is a horizontal section through a coffee pot showing in full lines the auxiliary coffee container in retracted or elevated position, and in dotted lines the lowered or immersed position of the container;

Fig. 2 is a fragmentary top plan view of the coffee pot shown in Fig. 1, but on a reduced scale;

Fig. 3 is a fragmentary section taken on line 3—3 of Fig. 1, and

Fig. 4 is a detailed view of the strainer for the under side of the auxiliary container.

In the drawing, I designates a conventional cylindrical coffee pot which is preferably composed of heat-resisting transparent material, such as Pyrex glass, provided with a handle 2, and a pouring spout 3. The top of the coffee pot is closed by a removable dome-shaped metallic cover 4, having a peripheral out-turned rim 5, adjacent the bottom thereof adapted to rest on top of the coffee pot 1. The lower edge of the cover carries a pair of diametrically opposed outwardly extending lugs 6 (one of which is shown in Fig. 3) adapted to engage in a groove 7 extending from each side of the spout 3 above the inner peripheral of the coffee pot 1. In applying the cover on the coffee pot, one of the lugs 6 is slipped in the groove 7 opposite the spout 3, so that the diametrically opposed lug will register with the spout, after which the cover is turned slightly by a knob 8 so that the last named lug 6 is also brought into the groove 7 to lock the cover in place.

A yoke member 9 terminates at its opposite extremities in short horizontal shaft portions 10 and 11 rotatably supported in bearings 12 and 13 suitably secured within the cover 4 adjacent its lower edge. The shaft portion 11 supported in bearing 13 projects outwardly a short distance beyond the side of the cover 4 and has affixed thereto a transversely disposed trip lever 14 (Fig. 2) to enable the yoke 9 to be rotated in the cover 4 substantially 180°. The upper portion of the bearing 13 is recessed vertically as at 13' to form a catch for the adjacent bent portion of the yoke 9 to retain said yoke in elevated position. The metal cover 4 at its open lower end is slightly yieldable to the extent that when the yoke 9, which is relatively rigid, presses upon the bearing 13, the cover diametrically expands, to permit the yoke 9 to ride over the catch on its way to the recess. When opposite the recess, the yoke 9 enters the same, and then the cover contracts diametrically to its normal position. On removing the yoke from the recess, the same expansion and contraction of the cover takes place. The action is positive and automatic. Intermediate its ends, the yoke is formed into a crank portion 15, which rotatably supports a metallic strap 16 looped around the crank and riveted or otherwise secured at its other end to the top of a coffee container 17, as clearly shown in Fig. 3.

The container 17 is in the form of an inverted cup-shaped or cylindrical member, the top portion of which is closed and provided with a series of perforations 18 for the purpose hereinafter set forth. The lower open end of the container 17 is adapted to be closed by a removable filter cover assembly, comprising an annular shell 19 slidable within the container and having a peripheral bead 20 adapted to abut against a complementary bead 21 around the bottom of the container 17. A filter pad or disc 22 of fabric or any other suitable filtering material, is held taut by means of an encircling tension ring 23 adapted to engage in an annular recess 24 formed in the shell by the peripheral bead 20.

The filter pad consists of a disc of cloth or the like with a peripheral hem open at one place to enable one end of the expansible steel ring, preferably stainless steel, to be inserted and pushed around until the spring steel ring 23 is entirely in the hem whereby a laterally radially outward push is exerted upon the disc 22. The lower edge of the shell terminates in an inwardly turned flange 25 forming a supporting rim for the ring 23 and filter pad 22, and the entire filter cover assembly is held in place in the container 17 by means of spring clips 26 secured on each side of the container and adapted to engage the under side of the bead 20.

In the use of my improved coffee pot, the cover 4 is removed and the pot 1 filled to a predetermined level with water. The spring clips 26 are flexed and the filter cover assembly is removed to permit the container 17 to be filled with the required amount of ground coffee necessary to obtain a brew of desired strength, after which the cover assembly is placed on the container 17 and retained thereon by the aforementioned clips 26. The cover 4 is then applied on the coffee pot 1 with the yoke 9 in retracted position maintaining the container 17 elevated above the level of the water in the coffee pot. The yoke 9 is held in retracted position, shown in full lines in Fig. 1, by means of the vertical recess 13' in the upper portion of the bearing 13.

When the water in the coffee pot 1 has reached its boiling point, the trip lever 14 is swung upwardly releasing the yoke 9 from its friction catch recess 13' and permitting said yoke to rotate substantially 180° downwardly by gravity, thereby quickly lowering the container 17 into the water in the pot 1. The air in the container 17 during this quick immersion escapes through the perforations 18 in the top thereof and the metallic strap 16 holds the container in fixed position adjacent the bottom of the pot 1, so that any turbulence created by the hot water will not affect a displacement of the container 17.

When the coffee brew has attained the desired strength, which is easily determined by observation through the glass pot 1, the container 17 is retracted in the top of the pot by swinging the trip lever 14 to rotate the yoke 9 in an upward direction where the latter is held in elevated position by the friction catch 13'. Should the first immersion fail to give the desired strength, a second immersion may be readily performed. It will thus be seen that this invention provides a simple crank mechanism for selectively elevating and immersing a coffee container in a brewing utensil, which mechanism is disposed within the utensil and is operable by a simple trip lever adjacent the side thereof, thereby rendering unnecessary the removal of the cover 4 to position the container in the brewing utensil.

From the foregoing, it will be seen that the invention which finds its environment in a coffee brewing utensil having a cylindrical coffee pot with a pouring spout at its open upper end, a dome-shaped cover for closing the upper open end of the pot, means for detachably securing said cover to the pot, a yoke member having a horizontal crank portion and shaft portions extending laterally thereof, one of which extends exterior of the cover, and a catch for engaging the yoke member for holding it in upward position, said yoke member and catch being within the cover, and adapted to be removed from the pot upon the removal of the cover, consists of the combination of an inverted cup-shaped container having an imperforate cylindrical portion with its closed top provided with perforations and its lower end open, a peripheral bend at said open end, a removable filter cover including an annular shell disposed within the open end of the container and having a peripheral head adapted to abut exteriorly of the container against the head of the same, means detachable, holding said filter cover to the container, and a strap member screwed to the top of the container and engaging the crank portion of the yoke member, whereby upon the disengagement of the yoke member from the catch the container automatically descends to the lower part of the pot, and the contents of the container is subjected to the steeping water as it is forced axially into the container from its filter and to the perforations of its top.

While I have shown and described the invention in connection with a coffee pot such as used for household purposes, the invention is equally applicable to any other brewing utensils. For example, coffee urns, teapots and the like. Furthermore, while I have referred to the coffee pot 1 as preferably composed of glass whereby it is possible to determine by observation the strength of the brew, the invention is obviously applicable to metallic or earthenware brewing receptacles.

From the foregoing it is believed that the construction and advantages of the invention may be readily understood by those skilled in the art without further description, it being borne in mind that numerous changes may be made in the details disclosed without departing from the spirit of the invention as set out in the following claims.

What I claim and desire to secure by Letters Patent is:

In a coffee brewing utensil having a pot for the water to be boiled, the combination of an inverted cup-shaped container for the coffee having an imperforate cylindrical portion with its closed top provided with perforations for the passage of air and its lower end open, a peripheral bend at said open end, a removable filter cover including an annular shell disposed within the open end of the container and having a peripheral head adapted to abut exteriorly of the container against the head of the same, means on the container detachably holding said filter cover thereto to support the coffee in the container, and a looped rigid strap member on the top of the container, with a yoke member having a crank portion engaged by said strap, and a catch for detachably holding the yoke member in vertical position, whereby upon the disengagement of the yoke member from the catch the container automatically descends piston-like to the lower part of the pot, and the contents of the container is subjected to the steeping water as it is forced axially into the container from its filter and to the perforations of its top, and whereby thereafter the container is moved above the water and held by the catch while the water is being subjected to boiling.

OTTO E. NESHAIM.